(12) United States Patent
Paatero (10) Patent No.: US 7,500,098 B2
(45) Date of Patent: Mar. 3, 2009

(54) SECURE MODE CONTROLLED MEMORY

(75) Inventor: Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 702 days.

(21) Appl. No.: 10/804,855

(22) Filed: Mar. 19, 2004

(65) Prior Publication Data

US 2005/0210287 A1    Sep. 22, 2005

(51) Int. Cl.
*H04L 29/00* (2006.01)
(52) U.S. Cl. ...................................... 713/165
(58) Field of Classification Search .............. 726/30; 713/190, 165
See application file for complete search history.

(56) References Cited

U.S. PATENT DOCUMENTS

| | | | | |
|---|---|---|---|---|
| 4,278,837 | A * | 7/1981 | Best | 713/190 |
| 5,455,862 | A * | 10/1995 | Hoskinson | 380/262 |
| 6,333,983 | B1 * | 12/2001 | Enichen et al. | 380/273 |
| 6,385,727 | B1 | 5/2002 | Cassagnol et al. | |
| 6,438,666 | B2 * | 8/2002 | Cassagnol et al. | 711/163 |
| 6,970,565 | B1 * | 11/2005 | Rindsberg | 380/270 |
| 7,130,951 | B1 * | 10/2006 | Christie et al. | 710/261 |
| 7,149,901 | B2 * | 12/2006 | Herbert et al. | 713/190 |
| 7,213,005 | B2 * | 5/2007 | Mourad et al. | 705/64 |
| 2002/0073326 | A1 | 6/2002 | Fontijn | |
| 2002/0099946 | A1 | 7/2002 | Herbert et al. | |
| 2003/0163718 | A1 | 8/2003 | Johnson et al. | |

FOREIGN PATENT DOCUMENTS

| | | |
|---|---|---|
| EP | 1273996 | 1/2003 |
| WO | WO 2004/015553 | 2/2004 |

* cited by examiner

*Primary Examiner*—Kambiz Zand
*Assistant Examiner*—Andrew L Nalven
(74) *Attorney, Agent, or Firm*—Alfred A. Fressola; Ware, Fressola, Van Der Sluys & Adolphson LLP (57) ABSTRACT

The present invention relates to a method of, and a system for, enhancing data security, which data is to be executed in an electronic device (101) comprising a secure execution environment (104) to which access is restricted. A basic idea of the present invention is that, at device boot, data in the form of e.g. program code is copied from permanent memory (112) to temporary memory (110). The integrity of this program code must be verified to ensure that the program code has not been altered during the transmission between the memories. Further, a new secret key is generated in the secure execution environment. This new secret key is used by a device processor (103) to encrypt the program code to be stored in the temporary memory in order to ensure that the program code is kept secret during transmission. The device processor thereafter writes the encrypted program code into the temporary memory.

34 Claims, 5 Drawing Sheets

SECURE MODE CONTROLLED MEMORY

TECHNICAL FIELD OF THE INVENTION

The present invention relates to a method of enhancing program code security, which program code is to be executed in an electronic device comprising a secure execution environment to which access is restricted, a system for enhancing program code security, which program code is to be executed in an electronic device comprising a secure execution environment to which access is restricted, a mobile communication terminal comprising the system, a programmable logic device comprising the system, a computer program comprising computer-executable components for causing a device to perform the steps recited in any one of the method claims and a computer-readable medium storing computer-executable components for causing a device to perform the steps recited in any one of the method claims.

BACKGROUND ART

Various electronic devices, e.g. mobile telecommunication terminals, portable computers and PDAs, require access to security related components such as application programs, cryptographic keys, cryptographic key data material, intermediate cryptographic calculation results, passwords, authentication means for externally downloaded data etc. Typically, it is necessary that these components, and the processing of them, is kept secret within the electronic device. Ideally, they shall be known by as few people as possible since a device possibly can be tampered with if its security related components are known. Access to these types of components might aid an attacker which has a malicious intent to manipulate a terminal.

Therefore, a secure execution environment is introduced in which environment a processor within the electronic device is able to access the security related components. Access to the secure execution environment, processing in it and exit from it should be carefully restricted. Prior art hardware comprising this secure environment is often enclosed within tamper resistant packaging. It should not be possible to probe or perform measurements and tests on this type of hardware which could result in the revealing of security related components and the processing of them.

The device architecture described hereinabove is not perfectly resistant to security attacks. It is, for example, desirable to offer enhanced protection against attackers of software that executes outside the secure execution environment. When the operating system of a device is booted, it is relatively simple to ensure that the proper software is started, since specifically developed protected application software is employed for these and other purposes, and the execution of these protected applications is strictly controlled. However, during subsequent execution, an attacker may make attempts to modify "normal" software application using various methods, and possible modifications of any software executing in the device should be prevented.

Protection of data and program code is highly desirable, since a malicious person may try to access sensitive data in the device in case this person is given access to the device, for example by stealing it. It may also be the case that a Digital Rights Management (DRM) system is implemented in the device. This DRM system stores copyright protected contents and associated digital rights that determine what type of access a user has to the content. The DRM system is thus used to protect the content from being accessed by an unauthorized user, misused and/or wrongly distributed. Since the contents and the rights have an economical value, the user may become tempted to try to access the contents by bypassing DRM control functions. Clearly, many different scenarios can be envisaged in which an attacker may attempt to manipulate a device.

A typical attack made is an attack referred to as the "modified-chip attack". In the modified-chip ("mod-chip") attack, an attacker attaches a small chip into the target device architecture. The mod-chip then modifies signals and/or data in the device architecture to manipulate the device. The complexity of mod-chips covers a broad range, from designs containing a simple microprocessor and associated software to highly complex designs incorporating field programmable gate arrays (FPGA) containing thousands of logic gates. Given an unlimited amount of time and sophisticated hardware/software, a skilled attacker may crack just about any system, and it may in practice be very difficult to secure a system against such brute force attacks. However, an acceptable security level of a system is, in most cases, a level where the security measures that are taken prevents an attacker from cracking the system, due to the fact that the required complexity of the mod-chips makes the design and production of the mod-chips prohibitively expensive. Thus, even though it may be virtually impossible to secure systems against brute force attacks which utilize highly sophisticated hardware/software, the systems shall be resistant to attacks which use less complex and hence less expensive modchips.

In the prior art, typical measures that have been taken to secure systems or devices include, for example, to impede access to system/device buses. Program code should be protected both during execution and when the code is stored in system memory. However, problems relating to device security still remains.

SUMMARY OF THE INVENTION

It is an object of the present invention to mitigate the problems set out above, and to provide for a secure system that offers enhanced protection against attackers of software that executes outside the secure execution environment.

This object is attained by a method of enhancing data security, which data is to be executed in an electronic device comprising a secure execution environment to which access is restricted, the method comprising the steps of: generating, in said secure execution environment, a new secret key repeatedly; verifying, in said secure execution environment, the integrity of data to be written into storage; encrypting, in said secure execution environment, the data by means of said new secret key; and writing the encrypted data into storage.

The object is also attained by a system for enhancing data security, which data is to be executed in an electronic device comprising a secure execution environment to which access is restricted, which system comprises: means arranged to generate, in said secure execution environment, a new secret key in said secure execution environment repeatedly; means arranged to verify, in said secure execution environment, the integrity of data to be written into storage; means arranged to encrypt, in said secure execution environment, the data by means of said new secret key; and means arranged to write the encrypted program code into storage.

The object is still further attained by a mobile telecommunications terminal, a programmable logic device, a computer program and a computer-readable medium employing the above-described system.

A basic idea of the present invention is that, at device boot when the device is started, data is copied from permanent memory—e.g. NAND flash memory—to temporary memory—e.g. RAM—from which temporary memory the data subsequently is executed. Typically, the data consists of program code. The integrity of this program code must be verified to ensure that the program code has not been altered during the transmission from the NAND to the RAM. This type of security critical operations is performed by the device processor in the secure execution environment. Note that NAND memory is always considered external memory, i.e. located outside the device, whereas the RAM mainly is located outside the device, but there is also a smaller amount of RAM located inside the device, i.e. internal memory.

Further, at device boot or during runtime, a new secret key is generated in the secure execution environment. This new secret key is used by the device processor to encrypt, when the secure operation mode of the processor is set, the data to be stored in the (external) RAM in order to provide confidentiality, i.e. to ensure that the data is kept secret during the transmission. The device processor thereafter writes the encrypted data into the RAM. Note that encryption of data/program code is of greater importance if the data/program code is to be stored in external RAM than if it is to be stored in internal RAM, as the internal RAM itself is regarded as relatively secure due to the fact that it is located within the device. However, if a high level of security is required, encryption of data/program code to be stored in internal RAM may also be performed.

The present invention is advantageous, since if an attacker wants to modify the code stored in the RAM, the attacker will have to procure the secret key such that the encrypted program code can be decrypted. If the program code is in the clear, the attacker may modify the code to manipulate the device. The attacker may also modify encrypted code, but these modifications would have a rather arbitrary effect, and do not have the effect that the device can be manipulated in a predictable manner. Since the access to the secure execution environment of the device, in which secure environment the secret key is stored, is heavily restricted, an attacker will have to cryptoanalyze the program code to procure the key. When a new boot sequence is undertaken, the above procedure is repeated. This has the effect that, when the device is booted, a new secret key is generated and used to encrypt the program code, which makes cryptoanalysis even more difficult due to the fact that the encryption key repeatedly is changed.

Another great advantage of the present invention is that less strong algorithms employed during runtime are compensated for. While strong encryption/integrity mechanisms can be used in permanent storage, they generally cannot be used at runtime. When doing one-time bulk accesses to permanent memory, thus reading a large amount of data or program code, there is only a small performance penalty with regard to data integrity checking. But in runtime, the algorithms that are used are weaker, as they may not delay execution and thereby create unacceptable latency. As a result, frequent key changes are applied in order to compensate for the runtime algorithms.

The generation of a new secret key may be performed at every new boot, but it may also be sufficient to generate a new key at randomly chosen boot sequences, or regularly chosen boot sequences where the term "regularly" does not necessary imply that a new key is generated at every new boot sequence. This is a trade-off between security on the one hand, and the processing required to generate new keys on the other. Each generated key shall be new as compared to the previously generated key, and ideally a generated new key is random compared to any other previously generated key. As an alternative—or complement—to generating a new secret key at boot, keys can be generated in runtime. In that case, a new key should be generated before a possible attacker has had time to gather the amount of data (or perform a sufficient number of calculations) required to break the secret key. Runtime key changes may be arranged such that a part of the "old" key is changed until the complete old key gradually has been replaced by a new key.

According to an embodiment of the invention, the program code must also be authenticated in the secure execution environment, so that the device is ensured that the program code originates from a trusted code provider. If authentication is not performed, a mod-chip attacker may supply the device with program code that already has been modified, i.e. the attacker may perform pre-boot modification of the program code.

According to another embodiment of the invention, the address of the memory location to which encrypted data is to be written is combined with the new secret key. For example, the numerical value of the address location in address space is concatenated to (or in some other appropriate manner combined with) the new secret key, and the resulting concatenation is used to encrypt said data, before said encrypted data is written into storage. Hence, the encrypted data becomes associated with the address at which the encrypted data is stored.

This embodiment is advantageous, e.g. if an attacker mounts a so called chosen plaintext attack, in which the attacker defines his/her own plaintext, feeds it to the encryption hardware and makes an analysis of the resulting ciphertext. This attack may be mounted when fixed program code is compared with (modified) program code that the attacker has chosen, but is difficult to implement in practice. However, this attack may also be mounted when both program code and data are encrypted. Even though the program code is fixed, data changes continuously, and the attacker may consequently be given access to several different data sets that are encrypted (in the same address location) with the same key, making cryptoanalysis possible. By using the hereinabove described concatenation to encrypt data and/or program code to be written into memory, the encryption key, i.e. the concatenation, will differ for each address location. This greatly impedes cryptoanalysis.

According to yet another embodiment of the present invention, a plurality of new secret keys is generated at device boot, wherein each new secret key is used to encrypt a respective subset of the program code. Hence, different secret keys may be used to encrypt different parts of the program code. Consequently, different parts of the temporary storage area, i.e. the RAM, may hold program code encrypted with different keys, making cryptoanalysis of the program code even more difficult.

According to still another embodiment of the present invention, address locations are permuted in address space at boot. This permutation, or reordering, makes it difficult for an attacker to know where a specific address is located in address space. For example, the address located at position number 1024 in address space is, at reboot, mapped to address location number 2048. At a further reboot, the address is mapped to position number 512, etc. This impedes attacks on the system.

According to other embodiments of the present invention, redundancy in the form of integrity data is employed. The use of integrity data such as checksums, message authentication codes (MAC) or other types of message integrity codes is well known. Storing integrity codes is expensive, as it requires additional memory. Thus, their use is preferably limited to security critical code, like protected applications.

As the storing of integrity codes is expensive, the number of bits that form the code should be small. However, the smaller the number of bits, the smaller the probability of detecting individual tampering. Assume that external memory is accessed in groups of 32-bit words. If a one-bit checksum is added to each 32-bit word, the probability that someone would guess the correct value of the one-bit checksum is 50%. If a two-bit checksum is added to each 32-bit word, the probability that someone would guess the correct value of the two-bit checksum is 25%, and so on. In one embodiment of the present invention, a cryptographic checksum, i.e. a MAC, is employed. The MAC is calculated as a function of the data for which integrity is to be provided and an integrity check key. This integrity check key comprises the new secret key, or possibly new secret keys, that were discussed hereinabove. In the invention, a relatively small number of bits may be used in the MAC, as the integrity check key changes in every boot. Hence, trial tampering must be done again at each boot (i.e. whenever the integrity check key is changed).

If a plurality of new secret keys is generated at device boot, integrity data may be calculated using different keys for different memory locations, so that the content at the respective memory location may not be swapped for a content at another memory location.

When data or program code is written into the RAM, the associated MAC is written into integrity protection storage, which preferably is located inside the device, but the MAC could also be stored in external memory. Use of external or internal memory is a compromise between cost, performance and security. The internal memory of the device, which may be implemented in the form of e.g. an ASIC (Application Specific Integrated Circuit), an FPGA, a CPLD (Complex Programmable Logic Device) or some other type of programmable hardware, is fast and secure but comparatively expensive. On the other hand, since external memory is less expensive, wider integrity codes may be stored, which increases security. In practice, a combination of internal and external memory will be employed for storing the integrity codes.

When the program code is to be executed, the device reads it from the RAM. The device verifies the correctness of the MAC, i.e. it is checked that the program code has not been modified. If an incorrect MAC is found, the device should stop operation to prevent a possibly modified program code from running.

According to yet another embodiment of the invention, the device processor can be set in one of at least two different operating modes. In the device, storage circuitry are arranged with at least one storage area in which protected data relating to device security are located. The processor is given access to the storage area when a secure processor operating mode is set, and is denied access to said storage area when a normal processor operating mode is set. The fact that the processor and the application it is executing is, or is not, given access to the storage area is what defines the actual operating modes.

The accessing of the storage area in the storage circuitry defines the secure operation mode of the processor. The storage areas that the processor can access while operating in the secure execution mode is referred to as the secure execution environment. As previously mentioned, these storage areas contain security related components such as application programs, cryptographic keys, cryptographic key data material, intermediate cryptographic calculation results, passwords, authentication means for externally downloaded data etc. In the secure execution mode, the processor is capable of accessing the security components. This is important, and highly advantageous, since the security restrictions imposed on the device in the normal, unsecure processing mode are severe.

Ideally, only so called protected applications, which typically are small-size applications for performing security critical operations inside the secure execution environment, are allowed to handle secret cryptographic keys. Protected applications are applications that may be issued by trusted providers, in which case they must be authenticated, but they may also be issued by any third party, regardless of whether this third party is trusted or not. In the latter case, no authentication occurs. It must be determined from the particular context whether the protected application must be issued by a trusted provider or not. Generally, applications that are arranged in such a way that they have, or are given, the power to jeopardize the security of the device should be trusted.

Protected applications may be regarded as a part of a normal application executing outside the secure environment. Protected applications may also comprise applications employed to implement standard functionality in the device. For example, protected applications are utilized for booting the device and loading an operating system into it. It is desirable that not even the device user, even though she cannot be considered to be an unauthorized third party, is given access to the secret cryptographic keys. Possibly, a DRM system is implemented in the device, and since the digital contents—and the associated digital rights—which are rendered by means of the DRM system, have an economical value, the user may try to access the contents by bypassing DRM control functions. Of course, there may be other reasons why a user should not be given access to the keys; the general security aspect must for example be taken into consideration.

In normal device operation mode, the device processor does not have access to security related data located within the secure environment. The security data includes cryptographic keys and algorithms, software for booting the circuitry, secret data such as random numbers used as cryptographic key material, application programs etc. Access to these security data and the processing of it is restricted. When testing and/or debugging the device, which typically is located in a mobile communication terminal, access to the security related data is not allowed. For this reason, the processor is placed in the normal, or "unsecure", operating mode, in which mode it is no longer given access to the protected data within the secure environment.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The present invention will be described in greater detail with reference to the following drawings, in which.

DESCRIPTION OF PREFERRED EMBODIMENTS OF THE INVENTION

Figure 1:
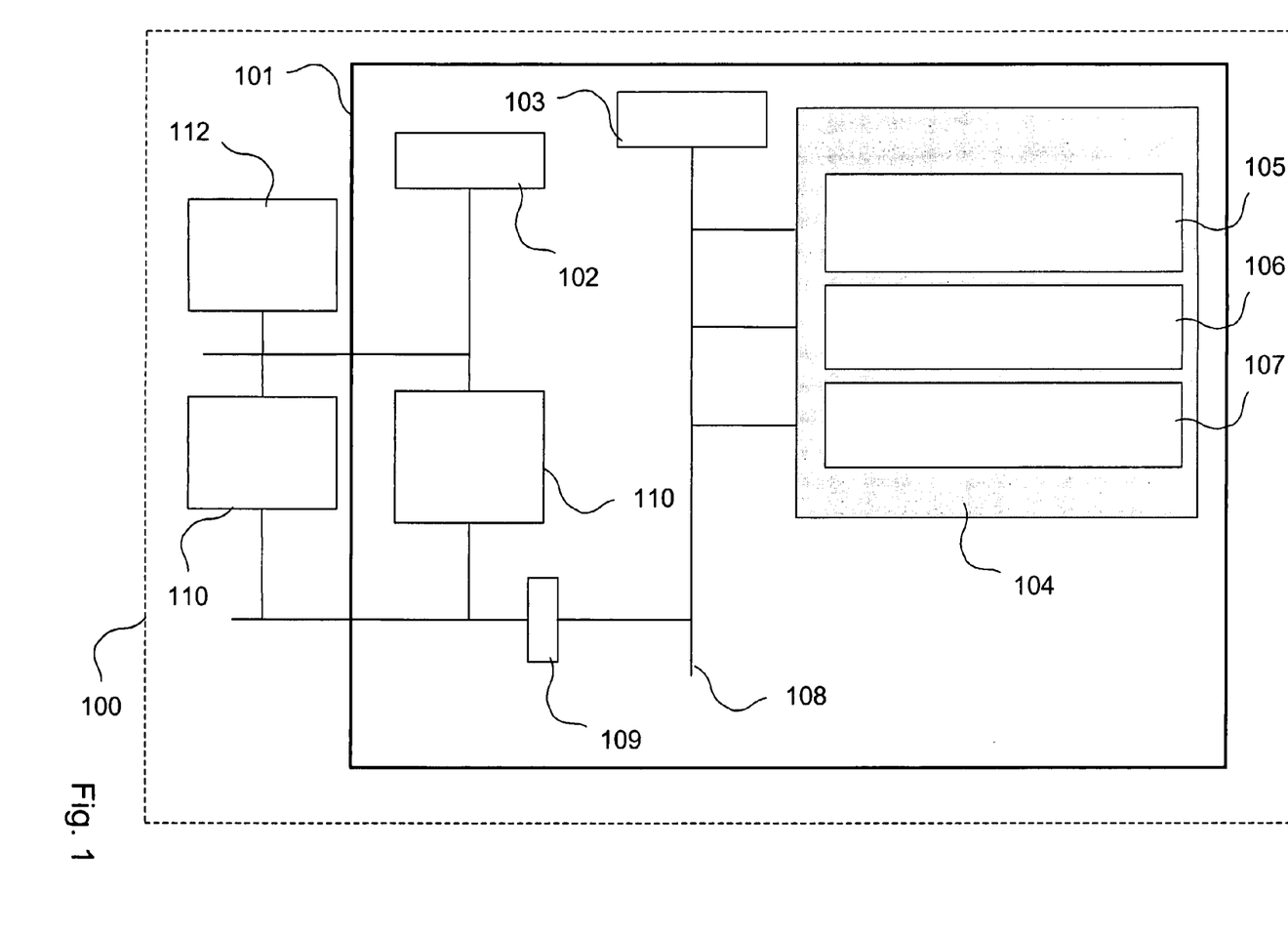
FIG. 1 shows a schematic diagram of a device architecture for providing data security in which architecture the present invention advantageously can be applied.

A device architecture for providing data security is shown in FIG. 1. Such a system is further disclosed in the Applicant's international patent application publication WO2004/015553, which application is incorporated herein by reference. Circuitry for providing data security is implemented in the form of an ASIC 101. The processing part of the architecture contains a CPU 103 and a digital signal processor (DSP) 102. The ASIC 101, is included in an electronic appliance 100 such as a mobile telecommunication terminal, a portable computer, a PDA etc. and is considered to be the "brain" of the appliance 100.

The secure environment 104 comprises a ROM 105 from which the ASIC 101 is booted. This ROM 105 contains boot application software and an operating system. Certain application programs residing in the secure environment 104 has precedence over other application programs. In a mobile telecommunication terminal, in which the ASIC 101 can be arranged, a boot software should exist, which software includes the main functionality of the terminal. It is not possible to boot the terminal to normal operating mode without this software. This has the advantage that by controlling this boot software, it is also possible to control the initial activation of each terminal.

The secure environment 104 also comprises RAM 106 for storage of data and applications, i.e. protected data. The RAM 106 preferably stores so called protected applications, which are smaller size applications for performing security critical operations inside the secure environment 104, but also objects such as cryptographic keys, intermediate cryptographic calculation results and passwords. Generally, the way to employ protected applications is to let normal applications request services from a certain protected application. New protected applications can be downloaded into the secure environment 104 at any time, which would not be the case if they would reside in ROM. Secure environment 104 software controls the downloading and execution of protected applications. The protected applications can access any of the resources in the secure environment 104 and they can also communicate with normal applications for the provision of security services.

In the secure environment 104, a fuse memory 107 is comprised containing a unique random number that is generated and programmed into the ASIC 101 during manufacturing. This random number is used as the identity of the specific ASIC 101 and is further employed to derive keys for cryptographic operations. Further, storage circuit access control means in the form of a security control register is arranged in the secure environment 104. The purpose of the security control register is to give the CPU 103 access to the secure environment 104, or preventing the CPU 103 from accessing the secure environment 104, depending on the mode set in the register. Operating modes for the CPU 103 can be set in the register by application software, resulting in the fact that the architecture does not have to rely on external signals. From a security viewpoint, this is preferable since by controlling the application software, the setting of processor modes can also be controlled. It is also possible to have an external signal (not shown) connected to the ASIC 101, by which signal it is possible to set the security control register. By using an external signal, a mode change can be executed easy and fast, which can be advantageous in test environments. A combination of these two mode setting means, i.e. application software as well as external signals, is feasible.

The architecture further comprises a standard bridge circuit 109 for limitation of data visibility on the bus 108. The architecture should be enclosed within a tamper resistant packaging. It should not be possible to probe or perform measurements and tests on this type of hardware which could result in the revealing of security related components and the processing of them. The DSP 102 and the CPU 103 has access to other peripherals 110, 112 such as a direct memory access (DMA) unit, RAMs, flash memories, and additional processors can be provided outside the ASIC 101. In the specific embodiments of the present invention, the peripherals 110, 112 are represented by a temporary memory (e.g. a RAM) and a permanent memory (e.g. a NAND flash memory), respectively.

Figure 2:
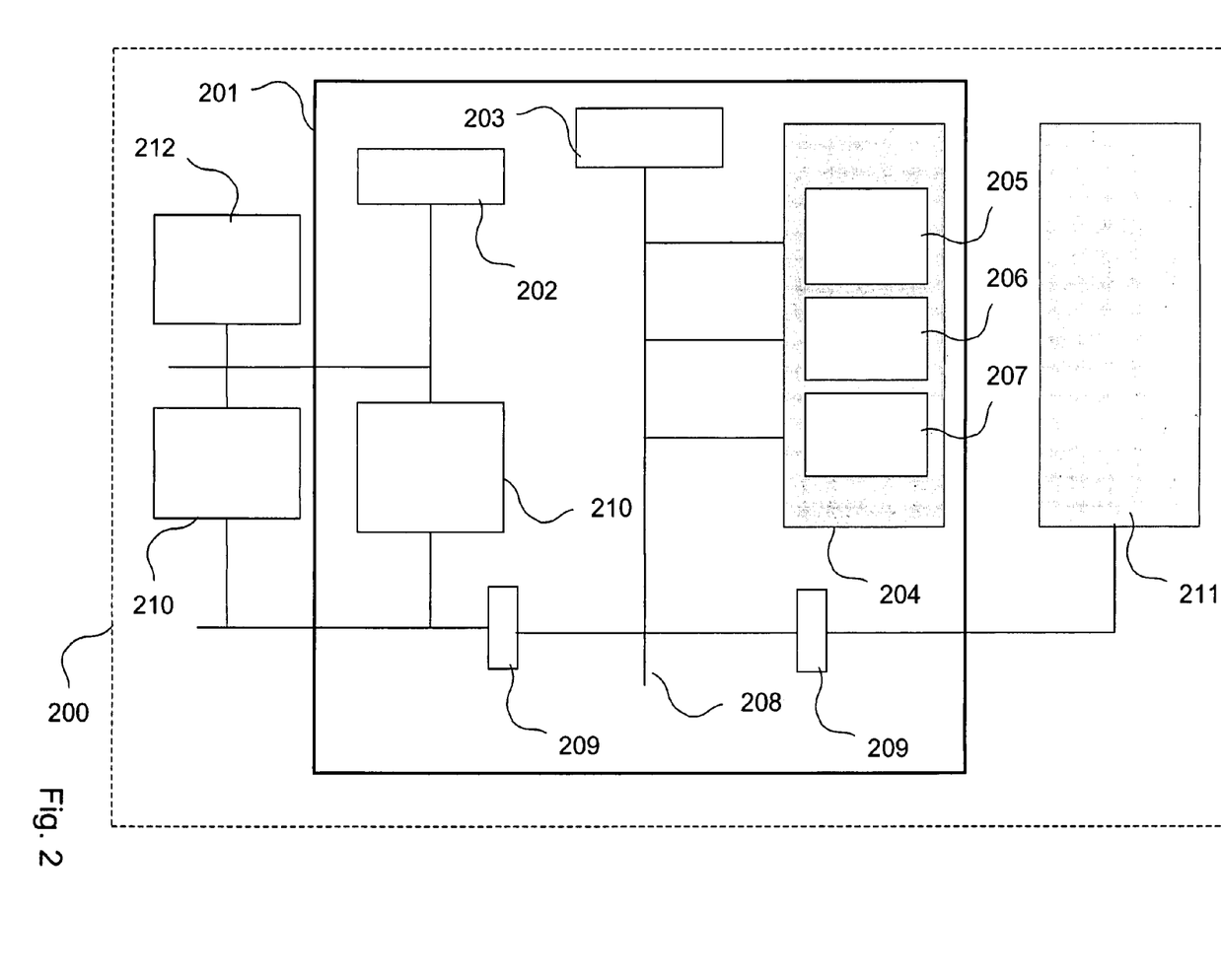
FIG. 2 shows a schematic diagram of the device architecture for providing data security, further arranged with a removable smart card, in which architecture the present invention advantageously can be applied.

Another embodiment of the device architecture for providing data security is shown in FIG. 2, wherein corresponding reference numerals denote corresponding elements as described in connection to FIG. 1. The difference in the architecture shown in FIG. 2, as compared to the architecture illustrated in FIG. 1, is that the electronic appliance 200 is arranged with a removable smart card 211, for example a SIM, which also may be considered to be a secure environment. For security purposes, the mobile terminal 200 and the smart card 211 stores digital certificates issued by trusted certification authorities (CAs). Certificates are used to ensure actors communicating with the mobile terminal 200 and/or the smart card 211 that the holder of a specific certificate has been authorized by the corresponding trusted CA. The CA signs the certificate, and the certificate holder must be in possession of the public key that corresponds to the private key of the CA to verify that a certificate signed by the CA is valid. Note that different devices can hold certificates from different CAs. In that case, the different CAs must perform some communication with one another, for example exchange their own public keys. Certificates are well known for those skilled in the art, and a well known standard certificate are the certificate contained in the CCITT recommendation X.509.

Figure 3:
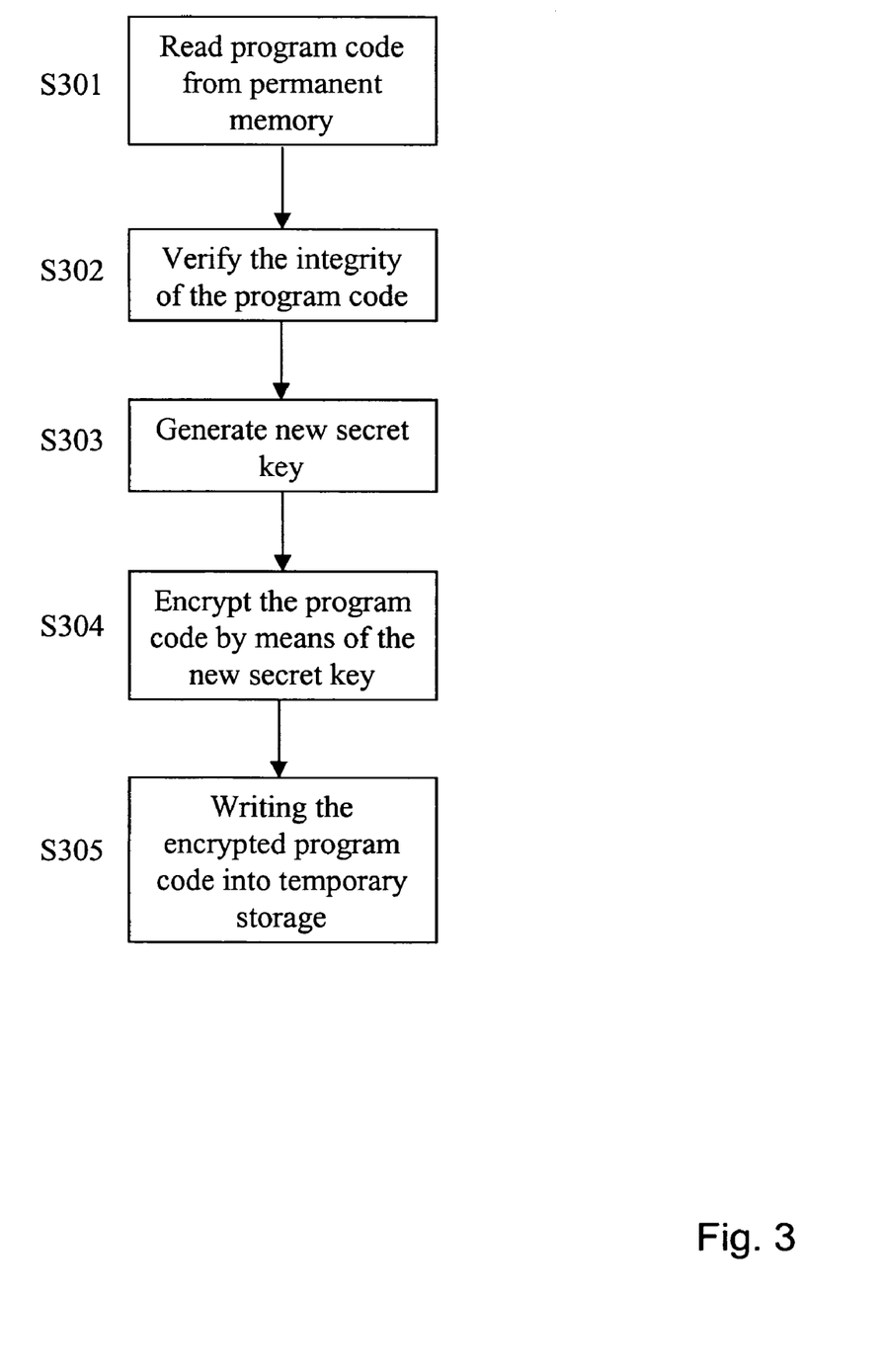
FIG. 3 shows a flowchart of the procedure followed at boot of the device according to an embodiment of the present invention.

FIG. 3 shows a flowchart of the procedure followed at boot of the ASIC 101, and a detailed description thereof will be provided in the following. A protected application is used to load the OS kernel into the ASIC during system boot (not shown in FIG. 3). When loading the kernel, the protected application checks the integrity and encrypts the program code that forms the kernel. Subsequently, during kernel code execution, the kernel program code is decrypted in the secure execution environment 104, and checks are made that the integrity codes associated with the kernel code are correct. Typically, with regards to encryption operations on program code and calculation of corresponding integrity codes, protected applications are used at the time of boot. During normal execution, hardware in the secure execution environment takes care of decryption and integrity verification. Note that in the drawings, data in the form of program code is employed to illustrate the teachings of the present invention. A man skilled in the art realizes that data in any appropriate form may be used, and hence the term "data" should not be limited to mean "program code".

When the OS is loaded into the ASIC 101, and the ASIC hence is provided with basic functions required to operate correctly, program code is read (at step 301, denoted by "S301") from permanent memory 112 to, subsequently, be written into temporary memory 110, from which temporary memory the program code will be executed. The integrity of this program code must be verified (S302) to ensure that the program code has not been altered during the transmission from the NAND 112 to the RAM 110. This type of security critical operations is performed by the CPU 103 in the secure execution environment 104. At device boot, the CPU generates (S303) a new secret key in the secure execution environment 104, and uses this key to encrypt (S304) the verified program code in order to ensure that the program code is kept secret during the transmission (S305) of the encrypted program code to the RAM 110. For processing operations like these, which require a high level of security, the secure operation mode of the processor 103 is set.

It should be noted that, for the provision of a high security level in the ASIC 101, a plurality of new secret keys is generated at boot. Each new secret key can be employed to encrypt a respective subset of the program code. Hence, different secret keys may be used to encrypt different parts of the program code. As will be appreciated from the following description, the generation of a plurality of new secret keys is particularly advantageous when integrity codes are to be provided for the program code that is to be stored.

Figure 4:
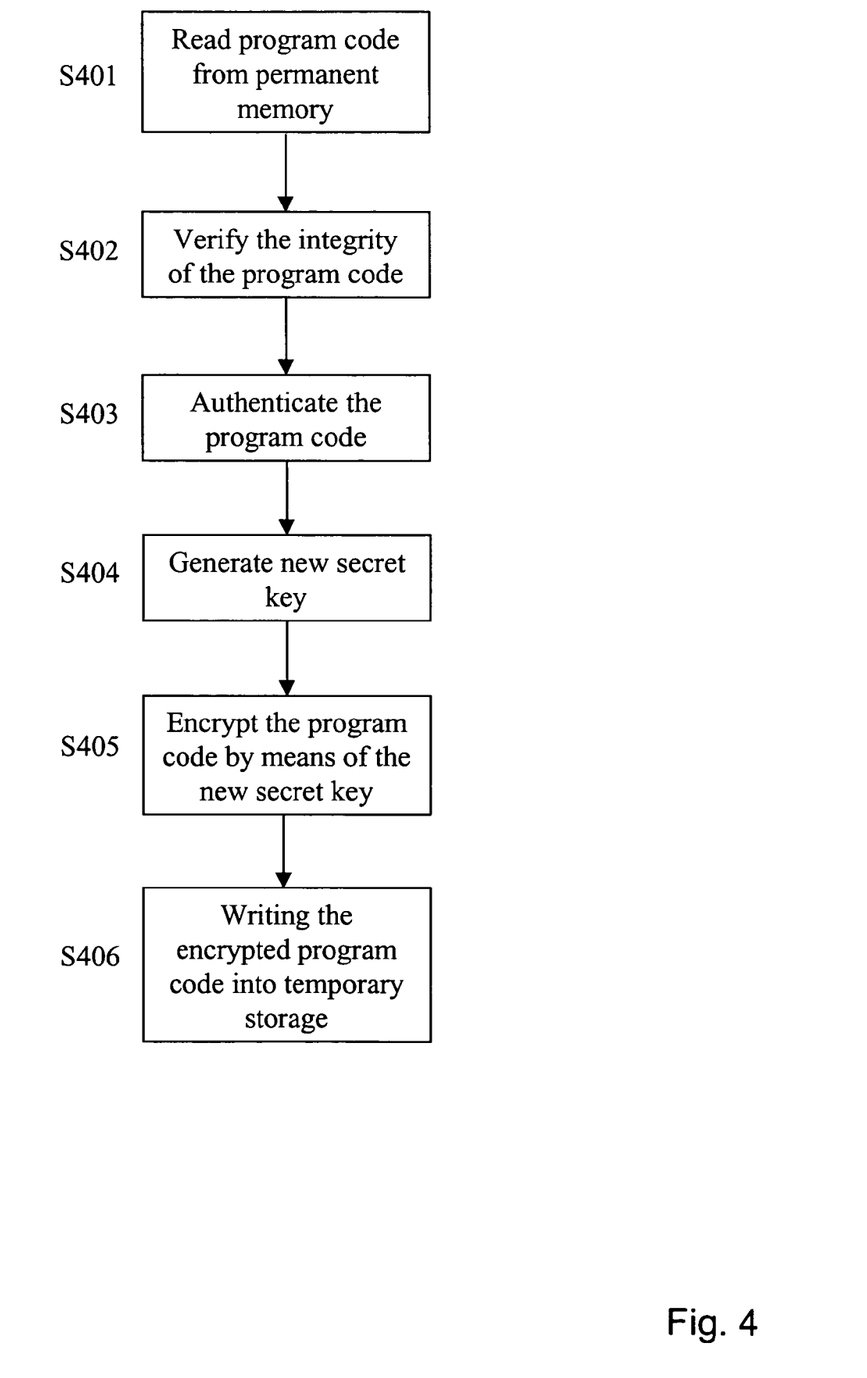
FIG. 4 shows a flowchart of the procedure followed at boot of the device according to another embodiment of the present invention.

FIG. 4 shows a further embodiment of the present invention, in which the program code that is read from permanent storage further is authenticated (S404) to ensure that the program code originates from a trusted program code provider. This is an additional security feature as compared with the embodiment described in connection to FIG. 3. The fact that authentication is undertaken implies that the program code has been provided with some authentication means, e.g. that it has been encrypted with a symmetric key known by the trusted provided and the ASIC 101, or provided with a digital signature.

Figure 5:
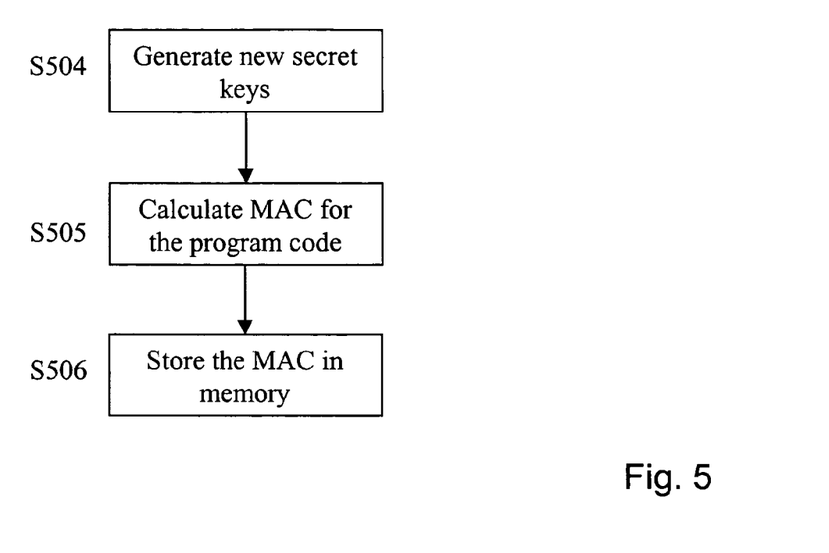
FIG. 5 shows a flowchart of the procedure of providing program code with a message authentication code according to an embodiment of the present invention.

To further improve the security level of the device, integrity codes may be used in the ASIC 101. It is known in the art to employ e.g. checksums or message authentication codes (MAC) for this purpose. An embodiment of the present invention deals with the calculation of integrity codes for program code, and a flowchart thereof is shown in FIG. 5. This flowchart can be seen as an extension of the flowcharts of FIGS. 3 and 4. When new secret keys have been generated (S504), a MAC is calculated for the program code which is to be stored in RAM 110. The MAC is calculated (S505) as a function of the program code for which integrity is to be provided and a generated new secret key. A commonly used MAC, or cryptographic checksum, is the Data Authentication Algorithm based on the Data Encryption Standard (DES) algorithm.

In practice, one MAC is calculated for each sequence of program code that is to be written into temporary memory. This means that if the external memory is accessed in groups of 32-bit words, a MAC is calculated for each 32-bit word of program code. Therefore, as previously mentioned, a plurality of new secret keys is generated at boot, and a respective new key is employed for the calculation of each MAC. When the program code is written into the RAM 110, the associated MAC is preferably stored (S506) into integrity protection storage 110 that is located inside the device.

Figure 6:
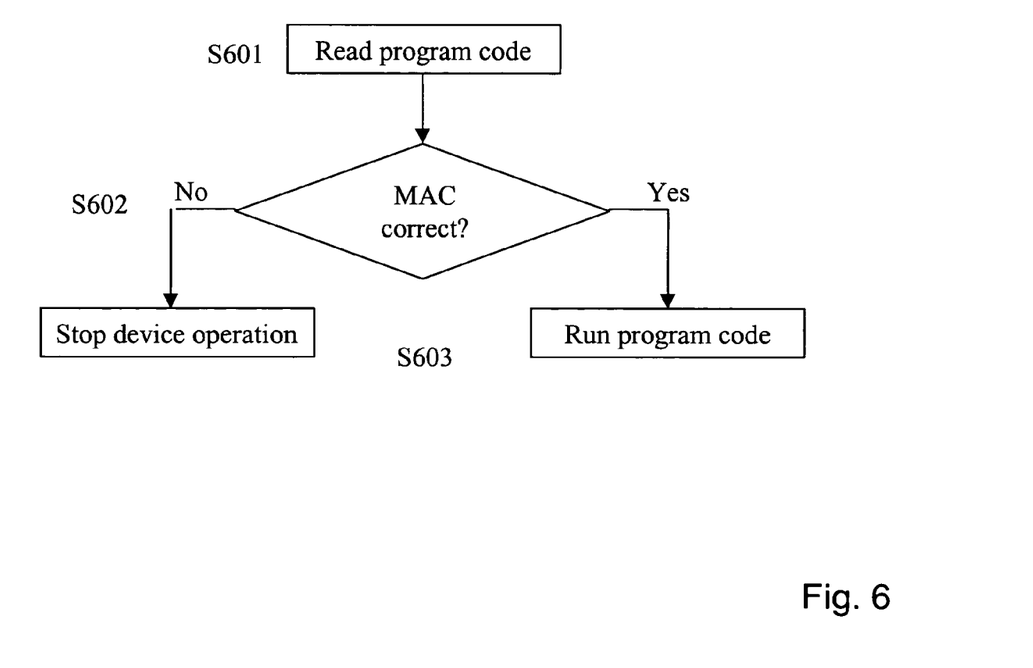
FIG. 6 shows a flowchart of the procedure of verifying correctness of a message authentication code according to an embodiment of the present invention.

In FIG. 6, it is illustrated that when the program code is to be executed, the CPU 103 (or the DSP 102) reads (S601) it from the memory 110 in which it is stored. The CPU verifies (S602) the correctness of the MAC, i.e. it is checked that the program code has not been modified. If an incorrect MAC is found, the CPU should stop operation (S603) to prevent a possibly modified program code from harming the ASIC 101.

As previously discussed, the processor 103 operates in two different execution modes: normal execution mode and secure execution mode, where the secure mode has precedence over the normal mode. In addition to these two execution modes, two program modes exist, namely "user mode" and "supervisor mode", where the supervisor mode has precedence over the user mode. In brief, user mode generally involves execution of user programs and supervisor mode involves execution of OS kernel programs. Typically, kernel programs include interrupt handlers, schedulers that determine which programs share processing time of the kernel and in what order, and a supervisor that gives each process use of the processor when the respective process is scheduled. These kernel programs are, as their names suggest, the very core of the device software. These kernel programs are considered highly security critical and are run in the supervisor mode of the secure execution mode. Protected applications such as the boot program are also considered highly security critical, but they are run in the user mode of the secure execution mode, such that they cannot compromise kernel functions, as could be the case if they are run in the supervisor mode.

The user mode and the supervisor mode will not be further described, as these are not essential for the understanding of the invention. However, it should be understood that cryptographic operations require processing power, and should not be performed without due cause. Moreover, storing integrity codes is expensive, as it requires additional memory. Consequently, trade-offs between device security and device costs must be made. If choices must be made whether certain types of program code is to be cryptographically process and other types not, this is the order of priority:

supervisor mode programs in secure execution mode (highest priority);
user mode programs in secure execution mode;
supervisor mode programs in normal execution mode;
user mode programs in normal execution mode (lowest priority).

Note that the skilled man realizes that the hardware comprised in the present invention typically executes appropriate software to perform the steps as described in connection to FIG. 3-6.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

What is claimed is:

1. A method of enhancing data security comprising:
reading strongly encrypted data external to a secure execution environment of an electronic device to which access is restricted, wherein said strongly encrypted data comprises program code to be executed in said electronic device,
verifying, in said secure execution environment, the integrity of said strongly encrypted data;
generating in said secure execution environment of said electronic device to which access is restricted, a new secret key for less strongly encrypting said verified data;
less strongly encrypting, in said secure execution environment, the verified data by means of said new secret key;
writing the less strongly encrypted data into storage, wherein at least some of said storage is external to said secure execution environment, and
repeating each of said above-recited actions.

2. The method according to claim 1, wherein a new secret key is initially generated when the device is booted.

3. The method according to claim 1, wherein a new secret key is generated repeatedly during runtime.

4. The method according to claim 1, wherein said storage comprises temporary memory.

5. The method according to claim 1, further comprising:
reordering address locations of said storage in address space at the time of boot, wherein the order of the address locations in address space is altered.

6. The method according to claim 1, further comprising:
authenticating, in said secure execution environment, the program code to be written into storage to ensure that the program code originates from a trusted program code provider.

7. The method according to claim 1, wherein the encrypting data further comprises:
combining the address of the location in said storage, to which location the encrypted data is to be written, with the new secret key; and
using the combination of the address and the new secret key to encrypt said data, wherein the encrypted data becomes associated with said address.

8. The method according to claim 1, wherein the generating a new secret key comprises generating a plurality of new secret keys, wherein each new secret key is used to encrypt a respective subset of the data.

9. The method according to claim 1, further comprising:
calculating, in said secure execution environment, integrity data for data to be stored in said storage; and
storing the calculated integrity data.

10. The method according to claim 9, wherein said integrity data comprises a message authentication code.

11. The method according to claim 10, wherein said message authentication code is calculated by using the generated new secret key.

12. The method according to claim 11, wherein different message authentication codes are calculated for different parts of the data by means of different new secret keys.

13. The method according to claim 12, further comprising:
verifying, in said secure execution environment, correctness of the message authentication code that is associated with read data; and
stopping device operation if said message authentication code is incorrect.

14. The method according to claim 1, further comprising:
setting a processor arranged in the electronic device in one of at least two different operating modes; and
storing protected data relating to device security in at least one storage area of a storage circuitry; wherein
the processor is given access to said storage area, in which said protected data are located, when a secure processor operating mode is set, and
the processor is denied access to said storage area when a normal processor operating mode is set.

15. The method according to claim 14, wherein the setting of processor modes is performed by protected applications.

16. A computer program product comprising computer-executable components stored in a memory for causing a device to perform the actions recited in claim 1 when the computer-executable components are run on a processing unit included in the device.

17. A computer-readable medium storing computer-executable components for causing a device to perform the actions recited in claim 1 when the computer-executable components are run on a processing unit included in the device.

18. An apparatus for enhancing data security comprising:
a processor:
arranged to read strongly encrypted data external to a secure execution environment of an electronic device to which access is restricted, wherein said data comprises program code to be executed in said electronic device;
arranged to verify, in said secure execution environment, the integrity of said strongly encrypted data;
arranged to generate in said secure execution environment of said electronic device to which access is restricted, a new secret key for less strongly encrypting said verified data;
arranged to less strongly encrypt, in said secure execution environment, the verified data by means of said new secret key;
arranged to write the less strongly encrypted data into storage, wherein at least some of said storage is external to said secure execution environment, and
arranged to repeat each of said above-recited actions.

19. The apparatus according to claim 18, wherein the system is arranged such that a new secret key is initially generated when the device is booted.

20. The apparatus according to claim 18, wherein the system is arranged such that a new secret key is generated repeatedly during runtime.

21. The apparatus according to claim 18, wherein said storage comprises temporary memory external to said secure execution environment.

22. The apparatus according to claim 18, wherein said processor is arranged to reorder address locations of said storage in address space at the time of boot, wherein the order of the address locations in address space is altered.

23. The apparatus according to claim 18, wherein said processor is arranged to authenticate, in said secure execution environment, the program code to be written into storage to ensure that the program code originates from a trusted program code provider.

24. The apparatus according to claim 18, wherein said processor arrangement to encrypt data further is arranged to combine the address of the location in said storage, to which location the encrypted data is to be written, with the new secret key, and to use the combination of the address and the new secret key to encrypt said data, wherein the encrypted data becomes associated with said address.

25. The apparatus according to claim 18, wherein said processor is
arranged to calculate, in said secure execution environment, integrity data for data to be stored in said storage; and
memory arranged to store the calculated integrity data.

26. The apparatus according to claim 25, wherein said integrity data comprises a message authentication code.

27. The apparatus according to claim 26, wherein said processor arrangement to calculate is arranged such that it uses the new secret key generated to calculate the message authentication code.

28. The apparatus according to claim 27, wherein said processor is
arranged to verify, in said secure execution environment, correctness of the message authentication code that is associated with read data and to stop device operation if said message authentication code is incorrect.

29. The apparatus according to claim 18, wherein said processor is
arranged such that it may be set in one of at least two different operating modes; and wherein said system further comprises
storage circuitry arranged with at least one storage area in which protected data relating to device security are located; wherein the system is further arranged such that:

the processor is given access to said storage area, in which said protected data are located, when a secure processor operating mode is set, and the processor is denied access to said storage area when a normal processor operating mode is set.

30. The apparatus according to claim 29, wherein the setting of processor modes is performed by protected applications.

31. A mobile telecommunication terminal comprising the apparatus according to claim 18.

32. A programmable logic device comprising the apparatus according to claim 18.

33. The programmable logic device according to claim 32, wherein said programmable logic device is implemented in the form of an application specific integrated circuit.

34. An apparatus for enhancing data security comprising:

means for reading strongly encrypted data external to a secure execution environment of an electronic device to which access is restricted, wherein said data comprises program code to be executed in said electronic device;

means for verifying, in said secure execution environment, the integrity of said strongly encrypted data;

means for generating, in said secure execution environment of said electronic device to which access is restricted, a new secret key for less strongly encrypting said verified data;

means for less strongly encrypting, in said secure execution environment, the data by means of said new secret key;

means for writing the less strongly encrypted data into storage, wherein at least some of said storage is external to said secure execution environment, and means for repeating the above-recited functions.

* * * * *